United States Patent
Alexander et al.

(10) Patent No.: US 10,181,894 B2
(45) Date of Patent: Jan. 15, 2019

(54) PROCESS AND APPARATUS FOR COMMUNICATING WITH USER ANTENNA PHASED ARRAYS

(71) Applicant: Stratospheric Platforms Limited, Douglas (IM)

(72) Inventors: Paul Alexander, Cambridge (GB); Peter Davidson, Douglas (IM); David Grace, York (GB); Andrew Faulkner, Cambridge (GB)

(73) Assignee: Stratospheric Platforms Limited, Douglas (IM)

( * ) Notice: Subject to any disclaimer, the term of this patent is extended or adjusted under 35 U.S.C. 154(b) by 0 days.

(21) Appl. No.: 15/758,472

(22) PCT Filed: Sep. 8, 2016

(86) PCT No.: PCT/GB2016/052780
§ 371 (c)(1),
(2) Date: Mar. 8, 2018

(87) PCT Pub. No.: WO2017/042569
PCT Pub. Date: Mar. 16, 2017

(65) Prior Publication Data
US 2018/0262264 A1 Sep. 13, 2018

(30) Foreign Application Priority Data
Sep. 10, 2015 (GB) .................................. 1516012

(51) Int. Cl.
*H04B 7/185* (2006.01)
*H04W 16/28* (2009.01)
(Continued)

(52) U.S. Cl.
CPC ......... *H04B 7/18504* (2013.01); *H01Q 21/24* (2013.01); *H04W 16/28* (2013.01);
(Continued)

(58) Field of Classification Search
CPC .. H04B 7/18504; H04W 16/28; H04W 84/12; Y02D 70/00; Y02D 70/1262; Y02D 70/142; Y02D 70/446; H01Q 21/24
See application file for complete search history.

(56) References Cited

U.S. PATENT DOCUMENTS 4,518,968 A * 5/1985 Hately .................. H01Q 9/16
343/802
5,518,205 A 5/1996 Wurst et al.
(Continued)

FOREIGN PATENT DOCUMENTS

| CN | 103022699 B | 2/2015 |
|---|---|---|
| SU | 1377942 A1 | 2/1988 |
| WO | WO 2005/084156 A2 | 9/2005 |

OTHER PUBLICATIONS

English language machine translation of Soviet Union Patent Publication No. SU 1377942 A1, European Patent Office, Feb. 29, 1988.
(Continued)

*Primary Examiner* — Dominic E Rego
(74) *Attorney, Agent, or Firm* — DASCENZO Intellectual Property Law, P.C.

(57) ABSTRACT

The use of phased array antennas in ground based or low altitude user equipment linked to high altitude aerial platforms also utilizing sparse phased-array antennas (uniform and non-uniform), which enables the delivery of information services, including telecommunications, earth observation, astronomical and positioning services with higher data rates, lower weight, power consumption and sidelobe levels than for other antenna arrangements.

24 Claims, 12 Drawing Sheets

(51) Int. Cl.
*H01Q 21/24* (2006.01)
*H04W 84/12* (2009.01)

(52) U.S. Cl.
CPC .............. *H04W 84/12* (2013.01); *Y02D 70/00* (2018.01); *Y02D 70/1262* (2018.01); *Y02D 70/142* (2018.01); *Y02D 70/446* (2018.01)

(56) References Cited

U.S. PATENT DOCUMENTS

| | | | |
|---|---|---|---|
| 6,018,659 | A | 1/2000 | Ayyagari et al. |
| 6,154,174 | A | 11/2000 | Snider et al. |
| 6,920,309 | B1 | 7/2005 | Yung et al. |
| 7,046,934 | B2 | 5/2006 | Bedesha et al. |
| 7,504,976 | B1* | 3/2009 | Pellon ................ H04L 27/36 341/143 |
| 8,854,255 | B1* | 10/2014 | Ehret .................. G01S 13/538 342/160 |
| 2002/0081969 | A1 | 6/2002 | Chang et al. |
| 2002/0128045 | A1 | 9/2002 | Chang et al. |
| 2003/0080913 | A1* | 5/2003 | Harris .................. H01Q 13/22 343/770 |
| 2004/0061653 | A1* | 4/2004 | Webb .................. H01Q 3/32 343/754 |
| 2004/0118969 | A1 | 6/2004 | MacCready et al. |
| 2007/0171127 | A1* | 7/2007 | Mizugaki ............ H01Q 21/064 343/700 MS |
| 2007/0229380 | A1* | 10/2007 | Oota ..................... H01P 5/107 343/762 |
| 2010/0171675 | A1* | 7/2010 | Borja ................... H01Q 1/38 343/798 |
| 2013/0028298 | A1* | 1/2013 | Manry, Jr. ........... H01Q 9/0464 375/211 |
| 2013/0070677 | A1 | 3/2013 | Chang |
| 2014/0252156 | A1 | 9/2014 | Heibl et al. |
| 2016/0211908 | A1* | 7/2016 | Noerpel .............. H04B 7/18506 |
| 2017/0033455 | A1* | 2/2017 | Husted ................ H01Q 3/02 |

OTHER PUBLICATIONS

English language abstract of China Patent Publication No. CN 103022699 B, European Patent Office, Feb. 11, 2015.

Search Report issued in connection with United Kingdom Patent Application No. GB 1516012.0, 2 pages, United Kingdom Intellectual Property Office, dated Mar. 17, 2016.

Chen, L. et al., "An Iteration Method of Sidelobe Suppressing of Unequally Spaced Array," Proceedings of 2014 Third Asia-Pacific Conference on Antennas and Propagation, IEEE, pp. 313-316, Jul. 26, 2014.

De Lera Acedo, E. et al., "Ultra-Wideband Aperture Array Element Design for Low Frequency Radio Astronomy," IEEE Transactions on Antennas and Propagation, vol. 59, No. 6, pp. 1808-1816, Jun. 2011.

Dessouky, M. et al., "Optimization of Beams Directions for High Altitude Platforms Cellular Communications Design," Proceedings of the 23$^{rd}$ National Radio Science Conference (NRSC 2006), pp. C16:1-8, Mar. 14-16, 2006.

Djuknic, G. et al., "Establishing Wireless Communications Services via High-Altitude Aeronautical Platforms: A Concept Whose Time Has Come?" IEEE Communications Magazine, vol. 35, No. 9, pp. 128-135, Sep. 1997.

El-Jabu, B. et al., "Cellular Communications Using Aerial Platforms," IEEE Transactions on Vehicular Technology, vol. 50, No. 3, pp. 686-700, May 2001.

Foo, Y.C. et al., "Other-cell interference and reverse link capacity of high altitude platform station CDMA system," Electronic Letters, vol. 36, No. 22, pp. 1881-1882, Oct. 26, 2000.

Grace, D. et al., "Improving the System Capacity of Broadband Services Using Multiple High-Altitude Platforms," IEEE Transactions on Wireless Communications, vol. 4, No. 2, pp. 700-709, Mar. 2005.

Miura, R. et al., "Preliminary Flight Test Program on Telecom and Broadcasting Using High Altitude Platform Stations," Wireless Personal Communications, 24 (2), pp. 341-361, 2003.

Thornton, J. et al., "Broadband communications from a high-altitude platform: the European HeliNet programme," Electronics & Communication Engineering Journal, vol. 13, No. 3, pp. 138-144, Jun. 2001.

\* cited by examiner

PROCESS AND APPARATUS FOR COMMUNICATING WITH USER ANTENNA PHASED ARRAYS

TECHNICAL FIELD

The invention relates to the use of sparse phased array antennas in ground based or low altitude user equipment linked to high altitude aerial platforms also utilizing phased-array antennas, which enables the delivery of information services, including telecommunications, earth observation, astronomical and positioning services with higher data rates, lower weight, power consumption and sidelobe levels than for other antenna arrangements.

BACKGROUND TO THE INVENTION

High altitude platforms (aircraft and lighter than air structures situated from 10 to 35 km altitude)—HAPS, have been proposed to support a wide variety of applications. Areas of growing interest are for telecommunications, positioning, observation and other information services, and specifically the provision of high speed Internet, e-mail, telephony, televisual services, games, video on demand, mapping services and global positioning.

High altitude platforms possess several advantages over satellites as a result of operating much closer to the earth's surface, at typically around 20 km altitude. Geostationary satellites are situated at around 40,000 km altitude, and low earth orbit satellites are usually at around 600 km to 3000 km altitude. Satellites exist at lower altitudes but their lifetime is very limited with the consequent economic impact.

The relative nearness of high altitude platforms compared with satellites results in a much shorter time for signals to be transmitted from a source and for a reply to be received (the "latency" of the system). Moreover, HAPS are within the transmission range for standard mobile phones for signal power and signal latency. Any satellite is out of range for a normal terrestrial mobile phone network, operating without especially large antennas.

HAPS also avoid the rocket propelled launches needed for satellites, with their high acceleration and vibration, as well as high launch failure rates with their attendant impact on satellite cost.

Payloads on HAPS can be recovered easily and at modest cost compared with satellite payloads. Shorter development times and lower costs result from less demanding testing requirements.

U.S. Pat. No. 7,046,934 discloses a high altitude balloon for delivering information services in conjunction with a satellite.

The patents, US 20040118969 A1, WO 2005084156 A2, U.S. Pat. No. 5,518,205 A, US 2014/0252156 A1, disclose particular designs of high altitude aircraft.

However, there are numerous and significant technical challenges to providing reliable information services from HAPS. Reliability, coverage and data capacity per unit ground area are critical performance criteria for mobile phone, device communication systems, earth observation and positioning services.

Government regulators usually define the frequencies and bandwidth for use by systems transmitting electromagnetic radiation. The shorter the wavelength, the greater the data rates possible for a given fractional bandwidth, but the greater the attenuation through obstructions such as rain or walls, and more limited diffraction which can be used to provide good coverage. These constraints result in the choice of carrier frequencies of between 0.7 and 5 GHz in most parts of the world with typically a 10 to 200 MHz bandwidth.

There is a demand for high data rates per unit ground area, which is rapidly increasing from the current levels of the order 1-10 Mbps/square kilometer.

To provide high data rates per unit ground area, high altitude unmanned long endurance (HALE) aircraft, or free-flying or tethered aerostats, would need to carry large antenna(s) to distinguish between closely based transceivers on the ground. A larger diameter antenna leads to a smaller angular resolution of the system, hence the shorter the distance on the ground that the system can resolve. Ultimately the resolution is determined by the "Rayleigh criterion" well known to those skilled in the art. The greater the antenna resolution, the higher the potential data rates per unit ground area are.

Furthermore having a large diameter antenna tends to reduce sidelobe levels from the antenna and this can be an important consideration when operating near the borders of countries with different allocations of spectrum.

Phased array digital "beamforming" (DBF) antennas have been considered for HAPS in for example, R. Miura and M. Suzuki, "Preliminary Flight Test Program on Telecom and Broadcasting Using High Altitude Platform Stations," Wireless Pers. Commun., An Int'l. J., Kluwer Academic Publishers, vol. 24, no. 2, January 2003, pp. 341-61. Other references include: http://ieeexplore.ieee.org/xpls/abs_all.jsp?arnumber=620534, http://ieeexplore.ieee.org/xpls/abs_all.jsp?arnumber=933305, http://digital-library.theiet.org/content/journals/10.1049/ecej_20010304, http://digital-library.theiet.org/content/journals/10.1049/el_20001316 http://ieeexplore.ieee.org/xpl/articleDetails.jsp?arnumber=4275149&pageNumber%3D129861 HAPs have a limited capacity to lift payload and provide power. This normally limits the antenna size even if the aircraft platform can accommodate a larger diameter of phased array.

At lower altitude, user equipment antennas, if of suitably large diameter, can send and receive signals from different HAPS without significant interference operating at a common frequency. This is described in David Grace, John Thornton, Guanhua Chen, George P. White, Tim C. Tozer: *Improving the system capacity of broadband services using multiple high-altitude platforms*. IEEE Transactions on Wireless Communications 4(2): 700-709 (2005).

The abstract of this paper provides a summary:

"A method of significantly improving the capacity of high-altitude platform (HAP) communications networks operating in the millimeter-wave bands is presented. It is shown how constellations of HAPs can share a common frequency allocation by exploiting the directionality of the user antenna. The system capacity of such constellations is critically affected by the minimum angular separation of the HAPs and the sidelobe level of the user antenna. For typical antenna beamwidths of approximately 5 degrees an inter-HAP spacing of 4 km is sufficient to deliver optimum performance.

The aggregate bandwidth efficiency is evaluated, both theoretically using the Shannon equation, and using practical modulation and coding schemes, for multiple HAP configurations delivering either single or multiple cells. For the user antenna beamwidths used, it is shown that capacity increases are commensurate with the increase in the number of platforms, up to 10 HAPs. For increases beyond this the choice of constellation strategy becomes increasingly important."

Transmission and reception of much higher data rates between individual user equipment can in principle be achieved by using multiple HAPS in a "constellation" where signals to and from the HAP antennas illuminate the same area but the user equipment antennas are able to distinguish between the different HAPS. The data rate can be at a multiple less than or equal to the number of HAPs in line of sight to that which could be achieved by a single HAP with a defined bandwidth, with the exact multiple determined by the signal to interference plus noise ratio at the receiver.

For such a system, there is benefit in using existing mobile, rather than the mm wavelengths referred to in the paper by Grace et. al.: frequencies (typically above 0.6 GHz to 4 GHz-50 cm to 7.5 cm wavelength—$\lambda$), due to their relatively low absorption and better penetration through walls and other objects. Higher frequencies up to 40 GHz (7.5 mm wavelength) can also be utilised if there is a clear line of sight. However at all frequencies referred to, the size of a conventional antenna needs to be substantial in order to spatially differentiate between neighbouring HAPs if they are close together as would be required for system capacity significant benefit.

As described in the paper referred to above by Grace et. al. (2005), beamwidth from the user equipment ground based antenna of only a few degrees is desirable if there are many (~16 or more) HAPS in line of sight. An antenna to give this resolution needs to be of diameter (D) around 35× the wavelength used (Rayleigh criterion, angular resolution~$1.22\lambda/D$). At the most commonly used mobile frequencies (~1 to 2 GHz) this leads to a required antenna diameter of over 5-10 m in diameter, and even at 20 Ghz leads to an antenna diameter of around 0.5 m.

Making a steerable dish antenna of such a size requires a large volume and is expensive. Furthermore if multiple HAPs need to be tracked, either the detector/transmitter arrangement near the focal point of the antenna becomes complicated and practically difficult, or multiple dish antennas are needed adding to the expense.

If many HAPs are to be used, spatial resolution to achieve high data rate alternatives to a conventional user equipment dish antenna are required—allowing ideally a lower expense and lesser volumes.

In the paper (Grace et al—2005), the user equipment referred to is ground based. However the principles also apply to elevated user equipment beneath the HAPs.

In the following description user equipment can be ground based or at an altitude lower than the high altitude platforms.

SUMMARY OF THE INVENTION

In a first aspect, the invention relates to a process for forming a plurality of simultaneous communication signals having an operating wavelength between (a) a plurality of phased array antennas each mounted on a respective high altitude platform (HAP) and (b) a phased array antenna mounted on user equipment at a lower altitude than that of the HAPs wherein the phased array mounted on the user equipment has operating antenna elements, the centres of which are spaced from their nearest operating antenna element centres by more than 1.2 times the operating wavelength and the phased arrays mounted on the HAPs have operating antenna elements, the centres of which are spaced from their nearest operating antenna element centres by more than 1.2 times the operating wavelength.

In a second aspect, the invention relates to apparatus for forming a plurality of simultaneous communication signals having an operating wavelength between a plurality of phased array antennas each mounted on a respective high altitude platform (HAP) and a phased array antenna mounted on user equipment at a lower altitude than that of the HAPs wherein the phased array mounted on the user equipment has operating antenna elements, the centres of which are spaced from their nearest operating antenna element centres by more than 1.2 times the operating wavelength and the phased arrays mounted on the HAPs have operating antenna elements, the centres of which are spaced from their nearest operating antenna element centres by more than 1.2 times the operating wavelength.

Thus, the invention provides a process for beamforming by user equipment using one or more phased arrays to communicate with multiple HAPs simultaneously to improve data transmission rates to and from the user equipment by allowing spatial resolution of individual HAPs from the user equipment when there are e.g. at least 4 HAPs in line of sight.

It has been discovered that a phased array allows—by varying the beamforming weights—multiple tracking and communication between the user equipment and multiple high altitude platforms or constellations of platforms if cooperative beamforming between platforms is used.

Such a phased array has the benefit of having a relatively small volume compared with that of a conventional dish. Phased arrays are typically less than one wavelength in thickness but a comparable area to a dish antenna of the same resolution. The volume of a phased array antenna can be as little as one tenth or one twentieth of the comparable enclosed volume of a dish antenna to achieve the few degrees spatial resolution necessary to avoid significant interference between signals to and from at least 4 HAPs.

Furthermore in the user equipment phased array, the beam direction is steered electronically by means familiar to those skilled in the art, and many beams can be produced allowing multiple HAPs to be tracked even if they change relative position, without the need for any moving parts or reorientation of a dish antenna.

A control system is needed to manage the tracking of the HAPS if they change position significantly. For a phased array, such tracking with relatively slow changes of position of the HAPS can be by simple maximisation of signal strength by the user equipment altering the relative "weights" of the phased array or by such a means modified by the knowledge of the individual HAPs positions and the position of the user equipment. For a dish antenna, mechanical movement of the antenna is likely to be required, or the use of multiple transmitters/receivers at or near the focal point of the dish.

It has been discovered that using of sparse phased arrays in such an application leads to a reduced cost, complexity and weight: the large number of antenna elements in a "dense packed" phased array where typically the antenna element spacings and sizes are comparable to the wavelength being utilised is unnecessary in such an application. The antenna size is determined by the need for high angular spatial resolution—a few degrees or less. A phase array antenna with dense packing for the purposes of amplification may be unnecessary. In that case it has been discovered that a sparse array, where the antenna element spacings are considerably greater than the wavelength utilised, can be most beneficial: there can be many fewer antenna elements reducing cost and weight.

Sparse phased arrays have long been known in radio astronomy and other communication fields.

A sparse array in this document is defined as a phased array where the spacing between the centres of antenna elements is normally significantly greater by a factor of more than 1.2 times $\lambda/2$ where $\lambda$ is the operating wavelength. A uniform sparse phased array is where the antenna elements are placed in a regular arrangement across the whole array. A non-uniform sparse phased array is one in which the antenna elements are placed in either a defined pattern across the array for specific characteristics, or, in a random configuration.

A dense array in this document is defined where the spacing between the centres of antenna elements is equal or less than $\lambda/2$ where $\lambda$ is the operating wavelength.

A sparse array can therefore exhibit one or more of the following advantages over dense arrays:

(i) Significantly improved resolution (decreased main beamwidth) when compared with a dense array using the same number of antenna elements. This allows more HAPs to be distinguished spatially.

(ii) Sidelobe level control by antenna element placing in lieu of element weighting. For example, in applications where both maximum energy output and sidelobe control are desired for the transmitting array, each antenna element may be operated at maximum power with the sidelobes controlled by element placement rather than "tapering" the array with reduced power in the outer antenna elements.

(iii) Placement of elements when physical constraints restrict potential sites. On antennas placed on aircraft, vehicles or trains opportunities may arise to use antenna elements placed on specific parts, for example the wing of an aircraft, along the length of a train or over the roof of a car thereby increasing the effective diameter and hence resolution of the antenna over that possible with a dense array.

It can be highly advantageous to link ground based phased arrays to WiFi systems and solar cell/battery arrangements to allow equipment with no external wiring to be solar powered but provide a high capacity data link between spatially resolved HAPs and user equipment within buildings or adjacent to them.

FIG. 9 illustrates the use of a phased array antenna (2202) spatially resolving two HAPs (2201). By way of example, the phased array antenna is in two parts (2203, and 2204) to allow one part to transmit information and the other to receive it, simplifying the supporting electronics. These examples have antenna elements (2205) shown in more detail of dimensions a×a cm. In the example shown for 2203 and 2204 the respective phased arrays have 5×5 or 25 elements and the dimension b=5a cm. The angle of resolution $\theta$ of the beams produced by the phased array is $\sim 1.22\lambda/b$ radians.

If typically a $\sim\lambda/2$, then the angle $\theta=1.22\times2/5=0.49$ radians or $\sim 30$ degrees. Such a resolution would be sufficient to resolve, if appropriate placed, two HAPs but not a much larger number.

By utilising a sparse array (2206) with a larger diameter c, but with a similar or smaller number of antenna elements it is possible to greatly increase the spatial resolution of the phased array antenna with a similar or smaller number of antenna elements. For example if c is fifteen times greater than b, it would be possible to reduce the resolution to $\sim 2$ degrees, more than sufficient to resolve over 20 HAPs in a diameter of under 20 km at 20 km altitude.

The invention also relates to a process for beamforming for communication between one or more sparse phased arrays supported on HAPs, and phased arrays attached to UE's at a lower altitude.

The sparse phased arrays on the HAPs can have further advantages in resolution, sidelobe level control, and placement of antenna elements as described above, particularly when high frequencies—10 GHz and above are used— where the alternative of having a conventional dense array requires a great many antenna elements.

Non-uniform sparsity can also bestow advantages if carried out electronically i.e. activating only a subset of antenna elements present.

The paper by E. de Lera Acedo, N. Razavi-Ghods, E. Garcia, P. Duffett-Smith, P. Alexander, "Ultra Wide Band Antennas in Aperture Arrays for Low Frequency Radio Astronomy," IEEE Transactions on Antennas and Propagation, Vol. 59 (6), pp. 1808-1816, June 2011. provides some background.

The invention will now be illustrated by way of an example system embodiment using sparse arrays in a HAPS based system, and with reference to the following figures in which:

DESCRIPTION

A glossary of terms is described in Table 3.

Figure 1:
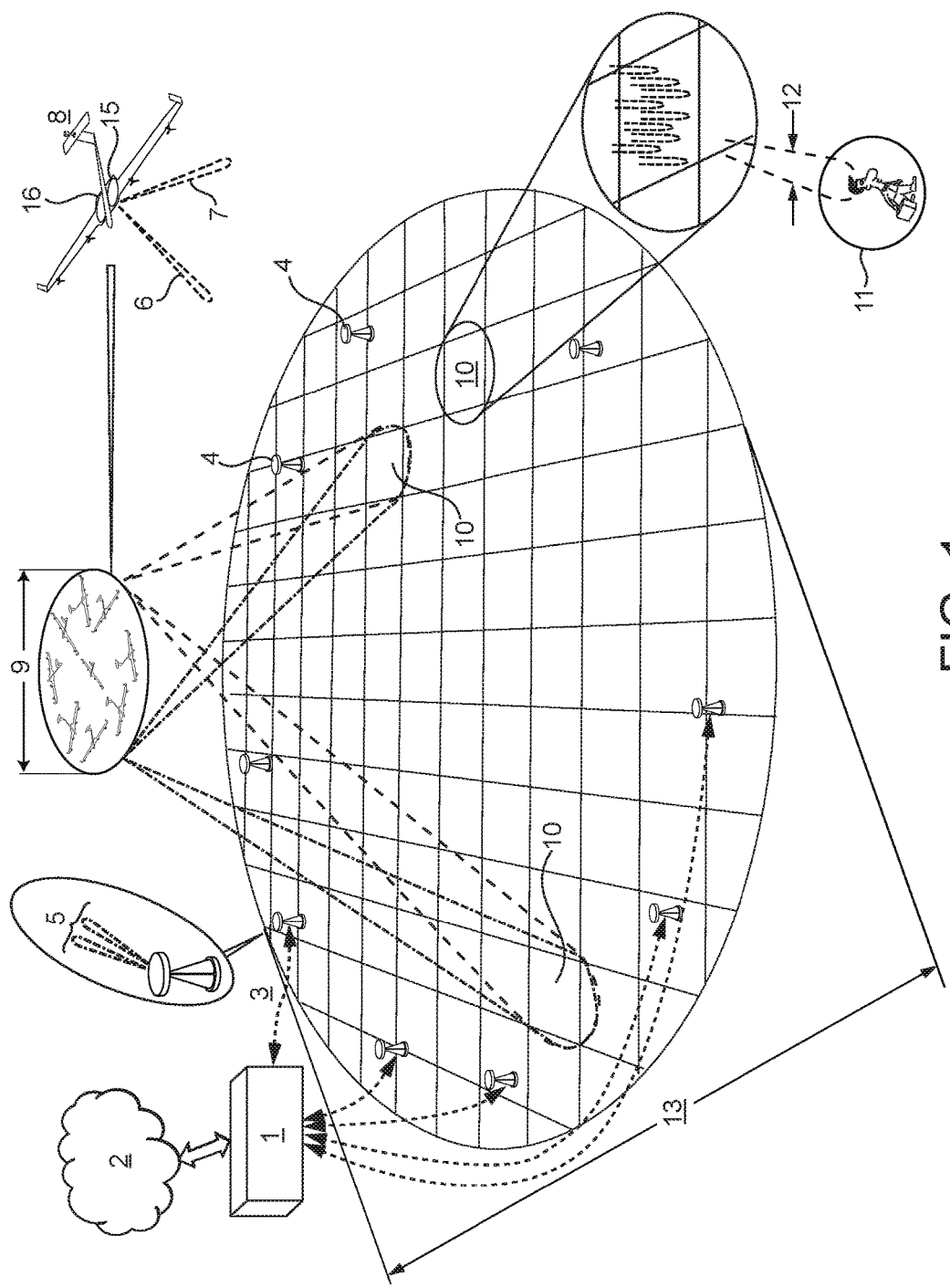
FIG. 1 is a schematic representation of a system embodiment with a mobile device as the user equipment.

FIG. 1 is a schematic representation of the system embodiment. FIG. 1 illustrates just one potential configuration: utilizing multiple aircraft (8) as the platforms to create a constellation of antennas over a 60 km diameter "Service area" (13). As shown, each aircraft platform (8) supports two antennas (15,16), one used for transmission and one for reception. These systems, when using beamforming technology, can provide many separate beams (6,7) in different directions to communicate with UEs (11) situated on different "patches" (10), areas illuminated by an antenna beam, and can also provide the "backhaul" links (5) to the "backhaul ground", BG stations (4). The UE shown in this case is a mobile phone but could be an antenna placed on the side of a house, on top of a vehicle, on an aircraft, ship, train, or inside a building.

This embodiment can provide communication links with BG stations (4) to provide the backhaul data communication systems that support the UE activities with the rest of the cellular network. The BG stations can also use sparse phased array systems with beamforming technology to communicate directly with the platforms under the control of a computer processing system, e.g. a ground-based computer-processing centre. The BG stations can be connected to the ground-based computer processing centres (1) via standard protocols; by fibre optic, or microwave connections or any other physical connection technology (3). For simplicity not all the links to the BG stations are shown in FIG. 1.

Figure 5:
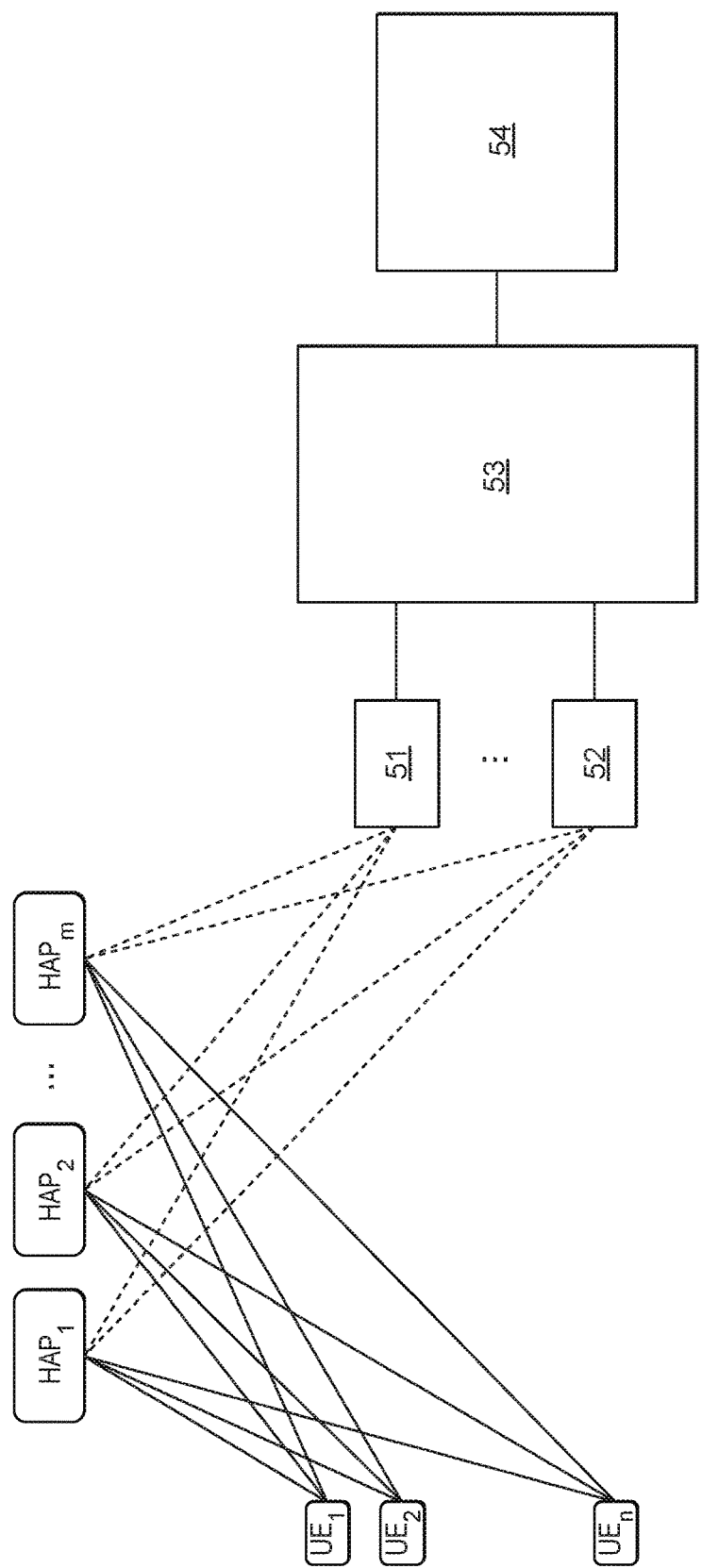
FIG. 5 is a schematic representation of the system arrangement and connection with a mobile telecommunications network.

An illustrative embodiment of the present invention, as shown in FIG. 5 includes:
1. The platform based phased array antennas ($HAP_1$), ($HAP_2$), . . . ($HAP_m$), which communicate with the many UEs ($UE_1$, $UE_2$ to $UE_n$) and BG stations (51,52) supported by aerial platforms (not shown).
2. Optional additional platform based receivers and transmitters that carry the backhaul data links (not shown).
3. The BG stations or other antennas which communicate with the platforms and link to the processing centre.
4. A processing centre (53), which calculates all the parameters for the communication links and provides the interface to the wider cellular network. (54).

Thus, the present invention provides that aerial antennas (at least four, but typically twenty or more in line of sight within the area in which the UE resides) provide beamforming for targeted communications with individual users, see FIG. 1: the beam (12) used for a single user within a particular patch can be very small if inter-platform beamforming is used, or can be quite wide—hundreds or thousands of meters depending on the wavelength used.

Figure 10:
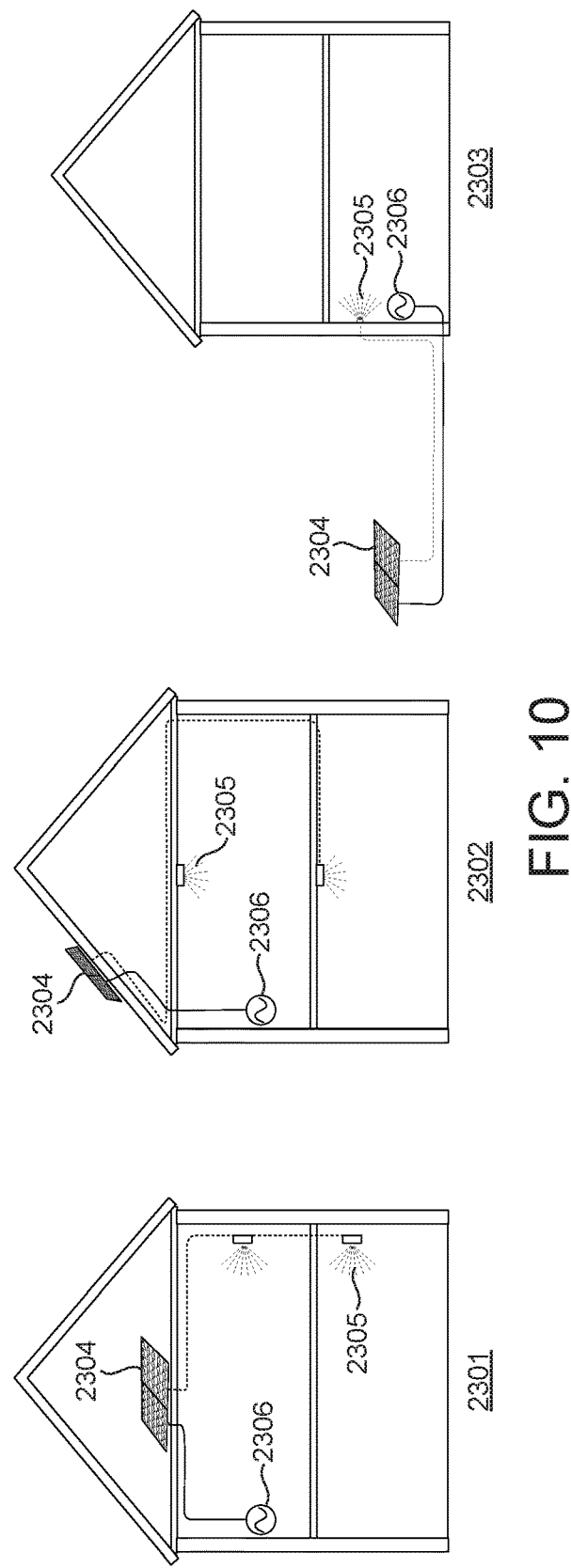
FIG. 10 is an illustration of ground based arrays providing high speed connectivity to a building.

FIG. 10 illustrates the use of phased array antennas (2304) linked to wifi antennas (2305) inside buildings supplied by their own power supplies (2306). The phased array antennas are sited in (i) a loft in a building (2301) above which the roof is of non-absorbent material for the frequencies used by the system, (ii) on the roof of a building (2302), (iii) on an external mount to a building (2303).

In the examples shown there are connections to a power supply (2306) and to the wifi system (2305). However given the modest power requirements of such a system, typically of the order of 1 watt or less, it has been realised it is entirely feasible to have a solar powered arrangement in cases, for example, such as provision of services as shown for buildings 2302 and 2303, and also on occasion to integral WiFi arrangements, therefore allowing a very cheap "stand alone box" installation with no external wire connections.

Sparse Phased Array Antennas

The UE may include transmitters or receivers or both. The aerial antennas are sparse phased arrays.

In this embodiment, the present invention involves the use of advanced sparse phased arrays. There follows a brief description of these technologies.

Phased arrays consist of a large number of individual antenna elements, but in the rest of this document "antenna(s)" will refer to one or more sparse phased arrays.

Phased arrays in general have a particular advantage for high altitude aircraft and other platforms in that their aspect ratio, the ratio of their width to depth is generally low, and thereby often easier to mount in a structure where low aerodynamic drag is required.

Antenna(s) mounted on HAPS can communicate both to and from UE, not primarily connected other than via the HAP antenna(s) with a large ground based communication network such as the internet or a cellular network. Such antenna(s) can also communicate with backhaul ground based stations ("BG stations") which are directly connected to a large ground based communication network and provide "backhaul" known to those skilled in the art.

Figure 2:
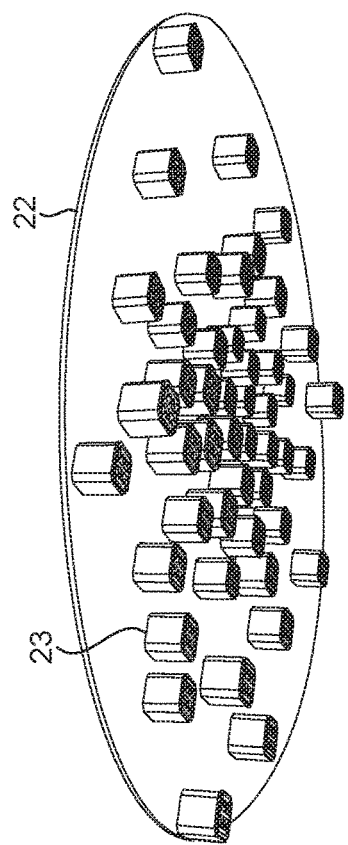
FIG. 2 is an illustration of a uniform and non-uniform sparse array.
Figure 2:
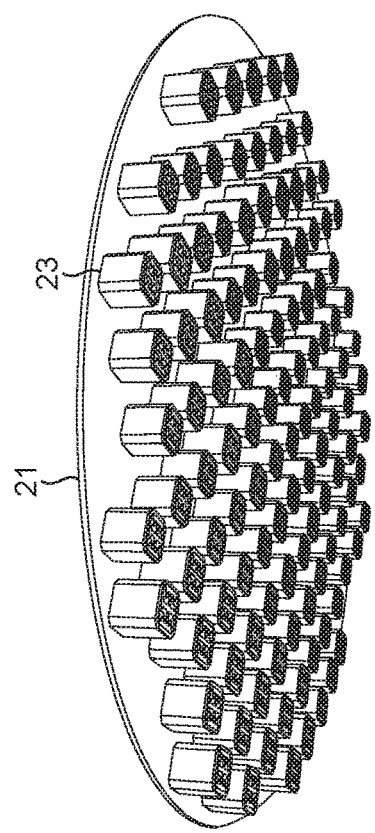

FIG. 2 is an illustration of a small uniform sparse phased array (21) and non-uniform sparse phased array (22). Each are an array of small antenna elements (23) which are connected to either the input of low noise amplifiers prior to digitization as a receiving system or to output amplifiers for transmission. Each antenna element is used independently and by controlling the precise time, or phase, of a signal between elements then a beam can be formed in a similar fashion as with a parabolic dish. The sparse phased array may be designed so the antenna elements are all planar as shown in FIG. 2 where two or more layers define the electromagnetic performance. The sparse phased array can also be a more complex shape, for example, "bowed" so that the outermost elements are pointing at an angle to the axis of the array. Further, the array can be distributed across a HAP structure or around structures supporting user equipment in a non-regular format for improved performance where appropriate.

Figure 11:
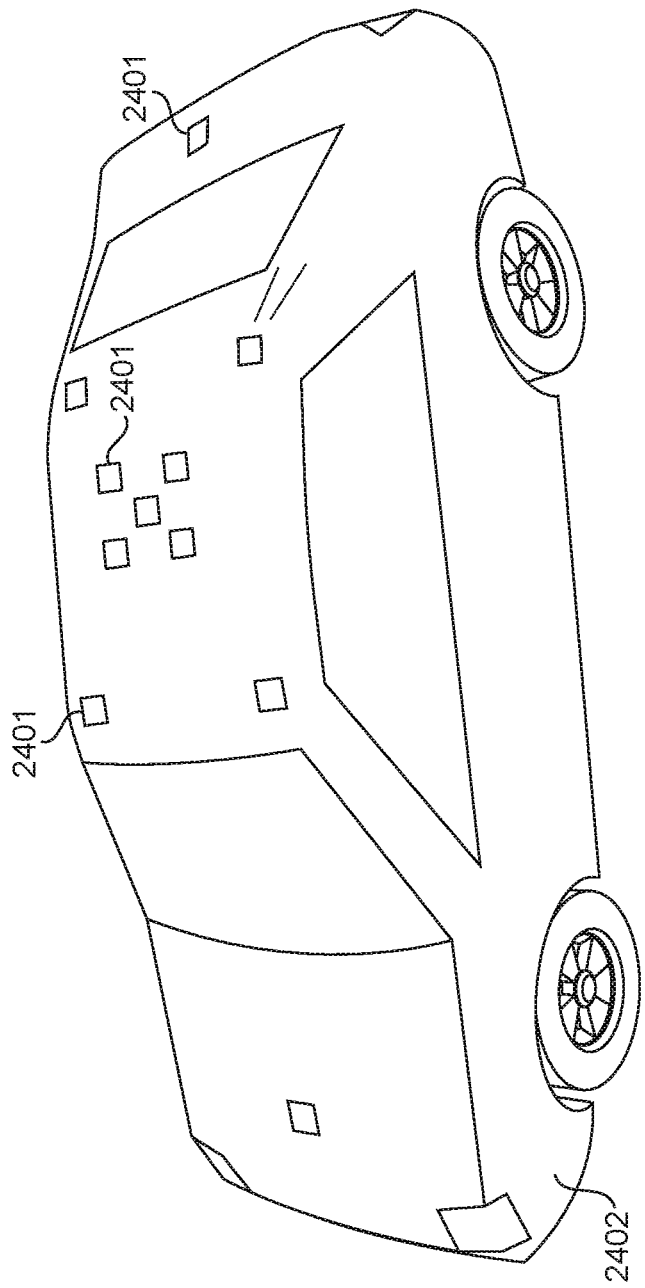
FIG. 11 is an illustration of a non-uniform sparse array on a vehicle.

FIG. 11 shows such a sparse array on a vehicle-array elements (2401) are placed on the roof of a car and also in this case on the front and back of the vehicle (2402). In this case the elements are around 7.5 cm in size but the effective diameter for beamforming is a couple of meters allowing a beam width for 2 GHz frequencies of 5 degrees or less. For operation at much higher frequencies—say 20 GHz, groups (2401) of much smaller antenna elements can be used, giving a much narrower beam width.

Figure 12:
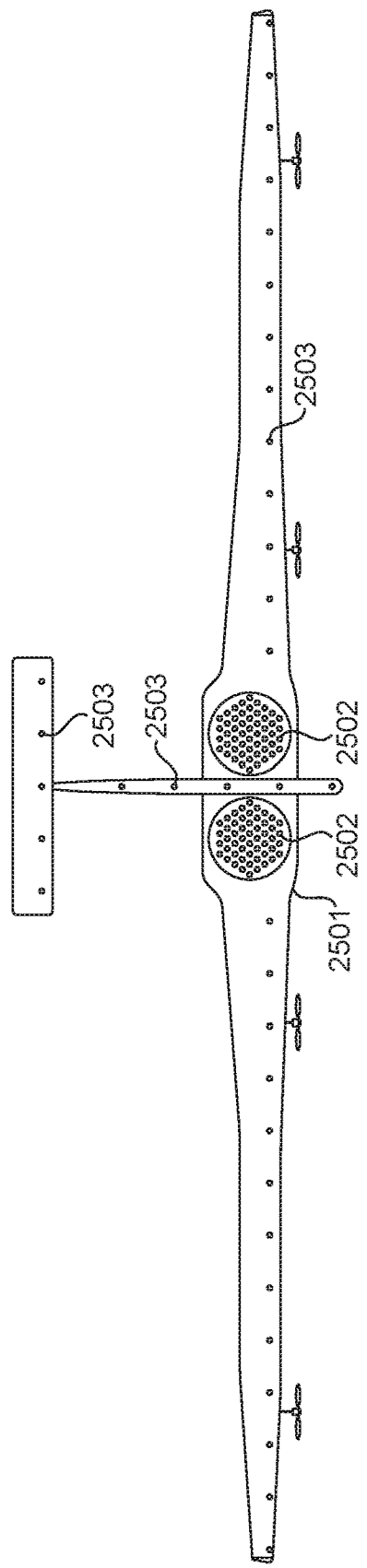
FIG. 12 is an illustration of a non-uniform sparse phased array placed on a HAP.

FIG. 12 shows a non-uniform sparse array placed on a high altitude platform (2501). By way of example the antenna elements are placed in two clusters (2502) but the antenna elements (2503) are also distributed along the wings, fuselage and tail.

By this means a much narrower beam can be developed than would be the case if the elements were just concentrated in arrays solely with the geometry shown by the clusters (2502).

The elements can be arranged so that a portion is involved solely for transmission purposes whilst others are solely involved in reception.

Figure 3:
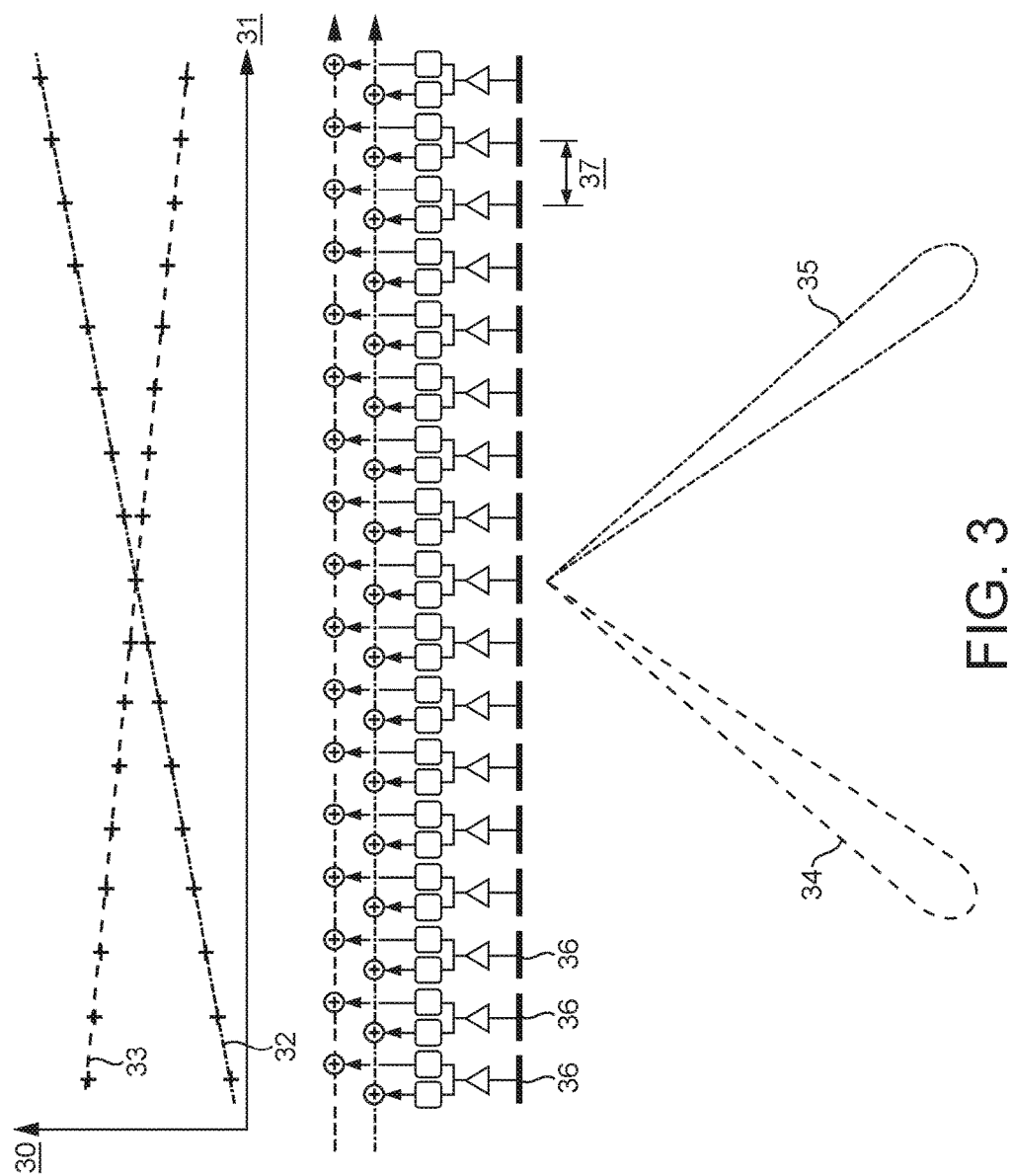
FIG. 3 illustrates beam forming on a single phased array.

The mechanism to form beams from a single receiving phased array is shown in one-dimension in FIG. 3, which shows beamforming on a single array. Phased-array beamforming is a well-established and understood technology and this embodiment supports sparse phased array antenna concepts. By way of illustration we consider a specific realisation in which each antenna element (36) is at a distance (37) from its neighbour of more than half the wavelength of the highest operating frequency; in the example shown in FIG. 3, which is designed to operate in the 2 GHz bands ($\lambda$=15 cm), the spacing (37) is >7.5 cm, in a non-uniform sparse array these distances will not be all the same. The array is able to detect the amplitude and phase of the received electromagnetic signal. Each antenna element is connected to a low noise amplifier. In the case of forming a beam for a flat array, the requirement is to have a signal delay across the width of the array linearly increasing with distance; this can be done in either the analogue or digital domain. The diagram at the top of FIG. 3 shows the relative delays (32) on the y-axis (30) used in producing the beam (35) of a uniform array, where the distance across the antenna is plotted on the x-axis (31). The signals from all the antenna elements suitably relatively delayed are then summed to form a composite signal, which is a "beam." The beam size is given by $\lambda/d$ where $\lambda$ is the wavelength and d the diameter of the array. In the case of a 2 GHz signal and a 1.5-meter diameter array, the beam would normally be ~5.7° wide. However, by appropriate antenna element "weighting" this can be tailored to widen the beam. This enables the beams to be varied to give approximately uniform coverage on the ground as changes in the elevation of the array from points on the ground result in the beam being spread to a greater or lesser extent over the surface.

The same process can be used by the phased array on the ground resolving spatially individual HAPs or different constellations of HAPs.

Sparse phased arrays also have the benefit that, by using recent developments in digital technology, very wide bandwidths can be implemented. The frequency range of antenna elements can be as high as 3:1 for planar antenna elements or even higher for non-planar antenna elements from the lowest to the highest frequency supported.

Because all the signals from each antenna element are available for any usage, it is practical to apply a different set of delays across the array and sum the second set of signals and form a second beam. As also illustrated in FIG. 3: another beam (34) can be produced by a different set of delays (33). This process can be repeated many times to form many different beams concurrently using the array.

Forming many beams in the digital domain can be readily achieved. The only requirement after digitization is additional processing resources and data bandwidth to communicate or further process all the beam information.

While it is possible to form a large number of beams with an individual phased array, the maximum number of "independent" beams that can carry data unique from all other beams cannot exceed the total number of antenna elements in the array. For example, if an array has 300 independent antenna elements (separated by $\sim\lambda/2$ or greater) there can be a maximum of 300 independent beams; more beams than this can be formed but these beams will not all be independent. In this instance the non-independent beams will each transmit and receive the same (or similar) encoded information—these beams may still be utilised by appropriate resource sharing schemes or in other ways relevant to the invention.

Sparse phased arrays can form beams over a scan angle range up to approximately ±60° from the axis normal to the plane of the array. This is due to the geometrical limitation of the array where the illumination area of the elements is reduced due to the scan angle; also the sensitivity of the beam of the individual antenna elements is reduced due to their being off the centre of the beam. The result is that the illumination area of the sky by a horizontal array is limited by the maximum scan angle to approximately 60 km diameter with large single arrays for transmit and receive.

Figure 6:
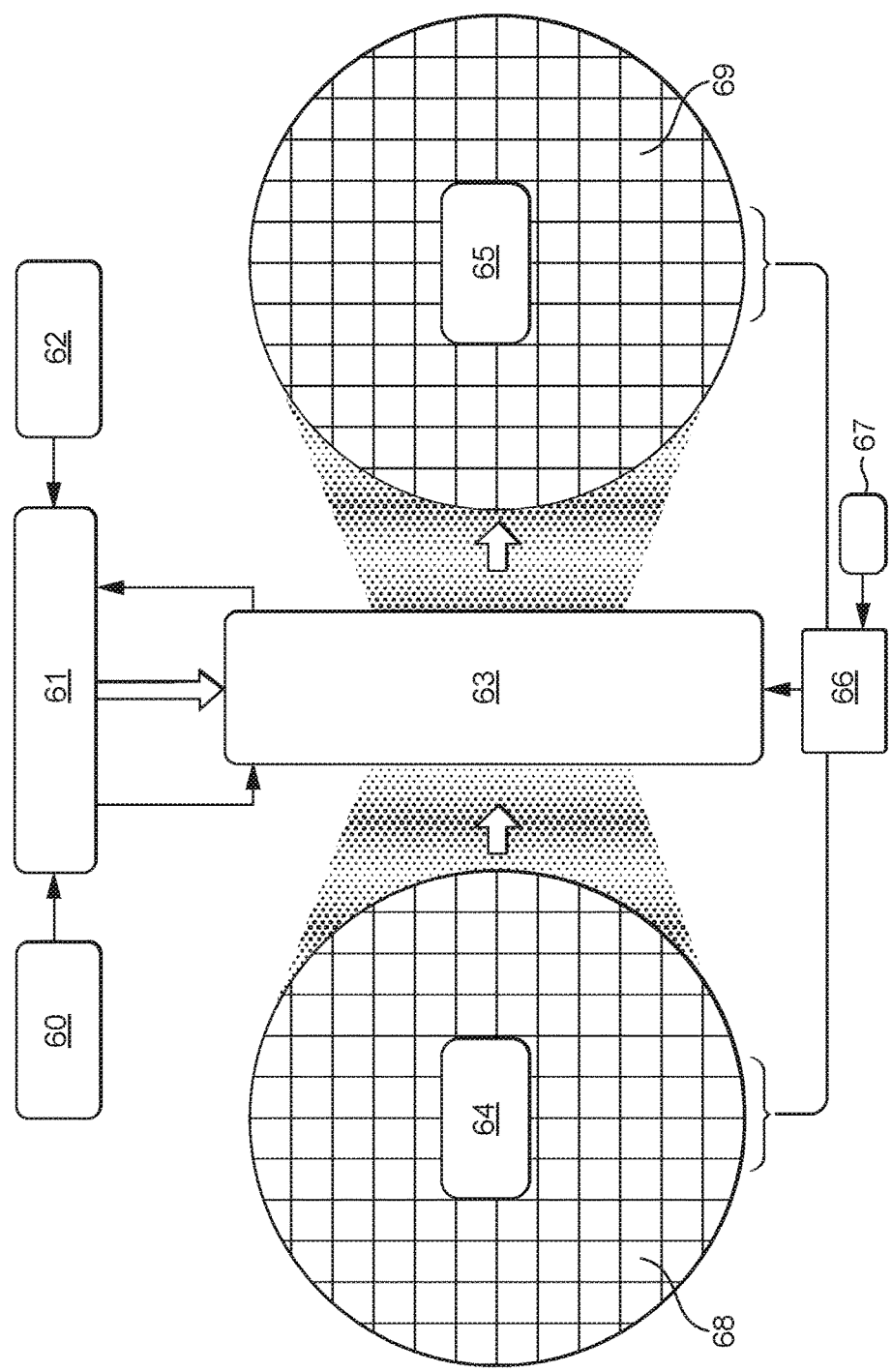
FIG. 6 is a schematic arrangement of an aircraft communication system.

Referring to FIG. 6, the receiving array may consist of many planar single or dual polarized receive elements (68) in a regular array (64). Each polarization is amplified, filtered and digitized over the receive bandwidth required. The antenna element electronics are conveniently mounted immediately behind the receive antenna element for low noise pickup, simpler assembly and to distribute the heat load over a large area. The digitized signal for each polarization is transmitted to the signal processing system for beamforming.

The transmit array (65) is of a very similar design and size as the receive array. It has many dual polarized transmit elements (69). Digitised signals are computed by the signal processing system for each polarization, transmitted to a digital-to-analogue converter, filtered, amplified, and passed to the output power amplifier for transmission. As with the receive array, the element electronics can be mounted behind the transmit elements to distribute the heat load and minimize stray radiation.

Depending on the embodiment of the array system, a position detection system (60) and an orientation detection system (62) can be used with a control and coefficient processor (61) interfacing with a signal processing system (63) in turn linked to a clock system (66) which can be interfaced in turn to a positioning system (67).

Beamforming

This embodiment utilises beamforming from the user equipment phased array antennas to generate spatially resolved narrow beams to HAPs or constellations of HAPs.

Figure 4:
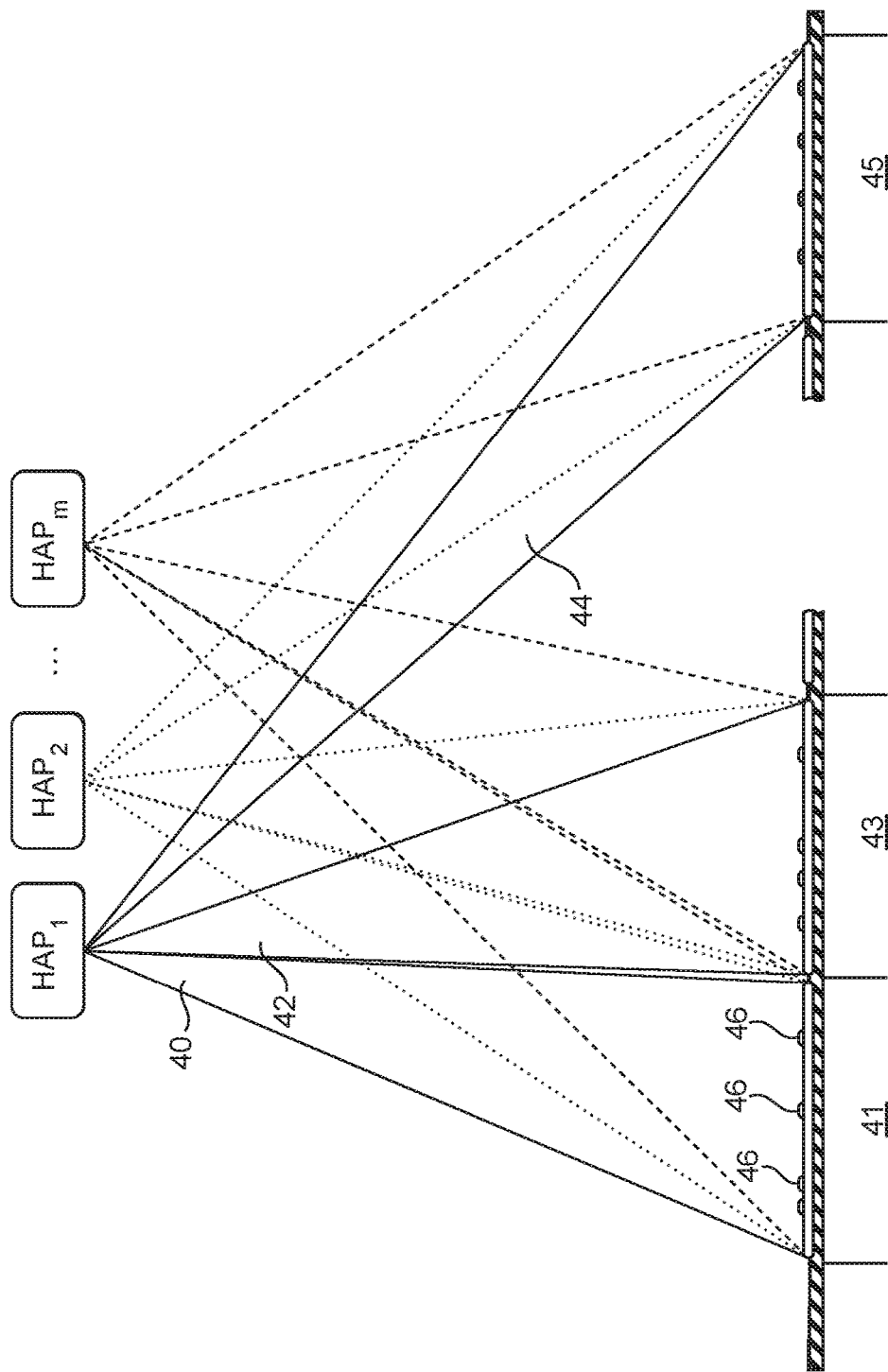
FIG. 4 illustrates beam formation by a constellation of antennas supported by aircraft.

The synthesized beams are computed to become "user beams" which track specific UEs. This is illustrated in FIG. 4, which shows beam formation in the service area, by a constellation of antennas labelled $HAP_1$, $HAP_2$ to $HAP_m$. The antenna on $HAP_1$ is shown producing three beams (40, 42, and 44), which are directed at three patches (41, 43, and 45). $HAP_2$ and $HAP_m$ are shown producing similar beams.

The minimum size of the area in the sky, the "resolution area," which an independent beam from a single aerial antenna could interact with, varies with its position relative to the aerial antenna. The "maximum beam data rate" (MBDR) that can be transferred to or from a single antenna within a beam is given by the number of bits per second per Hertz bandwidth, multiplied by the bandwidth available. The maximum number of bits per second per Hertz is limited by the signal to noise ratio of the signal, as is well known to those skilled in the art.

The beam sizes can be adjusted to be larger than the minimum beam size for a single antenna, so that area in the sky illuminated by each beam may be tailored to the requirements of the operational environment of the system.

Weightings on the antenna elements can be varied to control sky based patch sizes based on an optimization function reflecting the power received from each individual HAP, taking into account the orientation and attitude of the user equipment phased array antenna. In addition the antenna element weightings can be used to control beam side-lobe levels.

Platforms Supporting Antennas

In general the high altitude platforms will be in motion having a positive air speed and usually a measurable ground speed.

Platforms can be implemented as:

(i) Aircraft that are powered using either solar energy or hydrogen or hydrocarbon fuel to carry the communications equipment at approximately 20 km. The aircraft carry the equipment for communicating with UEs and with the BG stations. Also, they carry the signal processing systems, precise clock and timing units and control computers.

(ii) Free flying aerostats powered by solar cells or other technologies. The aerostats carry the equipment for communicating with UEs and with the BG stations. Also, they carry the signal processing systems, precise clock and timing units and control computers.

Figure 9:
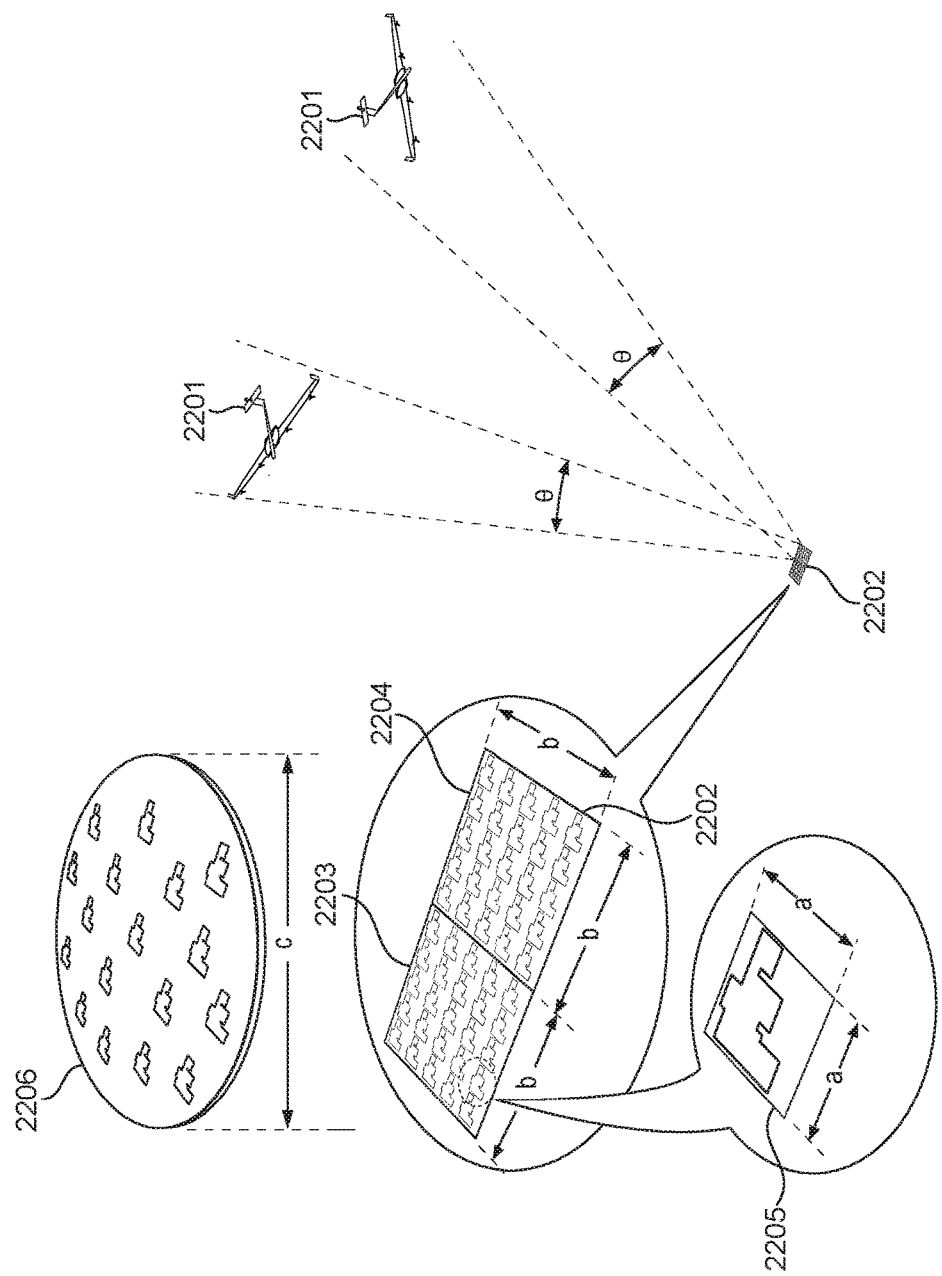
FIG. 9 is an illustration of a user equipment array spatially resolving two HAPs.

(iii) Tethered aerostats powered by hydrogen conveyed along the tether, or supplied with electrical power via the tether or supplied by solar cells situated on or connected to the aerostat platforms. A tethered aerostat supporting one or more tethers can carry a number of platforms at a number of different altitudes with each platform in turn supported by the tether(s). Each platform may also receive additional support from its own aerostat. The tethered platform system carries the equipment for communicating with UEs and with the BG stations, and they may carry the signal processing systems, precise clock and timing units and control computers or this may be ground based. FIG. 9 shows the layout of such a system:

(iv) Ground-based antennas based on very high towers or buildings where there is significant movement of the antenna of at least $\frac{1}{10}$ of the wavelength of the carrier signal.

(v) Conventional commercial aircraft used for passenger transport supporting additional intermittent aerial antenna capability.

(vi) Space-based satellites.

(vii) Hybrid air vehicles.

The system may consist of one or several types of platform described above.

Platform Communications with UE

The platforms are normally all equipped with at least two sparse phased arrays of equivalent size and number of elements, a transmit array and a receive array, to enable the system to have concurrent transmission and reception for any waveform and multiplexing technique that operates at the selected frequency allocation and bandwidth. It is possible to use a single array, but the electronics required is of greater complexity and weight, and may only support time division multiplexing, with resulting increased latency in data messages, and not the more usual frequency division multiplexing. The arrays form beams that divide the service area into a number of patches. The patches are treated as "cells" by the cellular telephone network.

The UE may be ground based or could be on a manned or unmanned aircraft at lower altitude than the aerial antennas and unmanned aerial vehicles. The UE could also be carried on some form of transportation technology including but not limited to trains, motor vehicles and shipping.

Backhaul Communications

The system of this embodiment can provide a "transparent" link between the cellular network and the individual users' devices in a similar fashion as conventional ground based mast-based systems. This provides compatibility with the existing cellular network.

The present invention allows for the possibility of a substantial amount of data communicated between the platform(s) and the UEs. Thus there has to be at least the same amount of data communicated through the backhaul system to and from the platform and processing system. The following are some options for transmitting the data from and receiving it to the platforms via the following communication links:

1. Use capacity on the sparse phased arrays used for communication to UE on each platform
2. Use alternative, high capacity links on alternative, higher frequency sparse phased arrays Both polarisations could be used independently on the backhaul link, potentially halving the number of BG stations required.

The embodiment described below will use implementation 1 above and share resources on the large arrays to provide both the backhaul communications and the user links.

Much of the technology used in the present invention is used in the telecommunications industry and develops techniques used in radio astronomy for beamforming and beam shaping. This embodiment results in a very high performance system that interfaces compatibly into most existing cellular telephone network technology.

Processing System

This embodiment is managed by a processing system, which may be a distributed system or, as shown in the figures, FIG. 1 shows a processing centre (1), which is normally ground based, saving weight and power on the aerial platforms. The processing system interfaces to the cellular telephone network (2), and it provides direct control of the signals being used by the platforms to communicate with the UEs.

The processing system may be physically distributed between a processing centre, processing co-located with the aerial antennas and/or backhaul ground stations, and processing services provided by third-party (known as "cloud") providers.

The processing system provides the interface to the cellular network through a defined interface to the cellular network.

The processing system computes for the aerial antennas:

(i) The beamforming coefficients required for the signals received from the UE and BG stations for these phased arrays, normally but not exclusively the coefficients for the antenna elements.

(ii) The phases and amplitudes for the signals to be transmitted to UE and BG stations.

(iii) All algorithms to implement operational aspects such as positional determination of platforms and user equipment.

For BG stations the processing system can compute and provide:

(i) The coefficients for the signals to be transmitted to the antenna elements by the BG stations to the aerial antennas.

(ii) The coefficients for the signals received from the BG station antenna elements in the sparse phased array antennas used.

For the UE phased arrays, the weighting coefficients can be derived by the individual UE control system without dialogue with the processing centre or with dialogue with the processing centre.

The BG stations can be linked directly to a processing centre via high-speed connections such as fibre optic data links or direct microwave links.

The signals at the platform are complex in that they define all the characteristics to enable the individual platform phased arrays to beamform precisely onto individual patches.

All these signal processing and beamforming calculations are performed in the processing system. The processing system may comprise at least one processing centre with some processing required on each platform. Such processing centres are ideally located at ground-level, for simplicity. Preferably however, ground level processing dominates the overall signal processing capability, consuming over 70 percent, preferably over 90 percent of the signal processing electronics electrical power requirements.

The processing system also determines how the system presents itself to the cellular network, including providing the required interface to enable efficient resource allocation.

The processing system may be capable of a further range of enabling functions, as will now be illustrated.

The processing system will support all resource allocation methods required by the cellular network including, but not limited to, frequency and time multiplexing. The processing system will also determine the frequencies that will be used by each platform. This can be up to the full bandwidth of the frequency allocations or restricting the bands for specific network or mobile phone operators using either overlaid systems according to the present invention or a mixture of ground based antennas and the present system. It would also support co-operative use of multiple operators, assuming suitable agreements can be reached.

The system can also use time division multiplexing or other radio resource sharing techniques.

Programmable signal processing components, Field Programmable Gate Arrays, FPGAs, are now of a power and capability suitable for this system. Such devices are now available that can perform this task, e.g. the Kintex (www.xilinx.com/products/silicon-devices/fpga/kintex-ultrascale.html) family of devices from Xilinx, which feature up to 8 Tera MACs (Tera=$10^{12}$; MAC=Multiply Accumulate, the basic processing operation in digital signal processing) processing capability and 64×16 Gb/s communication channels using modest power, typically under forty watts.

The signal processing system uses information transmitted from the processing centre to form required beams on the UEs and (if required) on the BG stations. The data in the beams that are formed is retransmitted to users, BG stations or used by the control processors on the aircraft.

As discussed, processing on the platforms is preferably minimised, however there may be at least some processing carried out there which can include:
  Reconstruct the coefficients used by the signal processors to form the required beams;
  Use information from the position and orientation systems as part of the beamforming process;
  Monitor, control and report the status of the aircraft payload systems.

The processing capabilities required are of the order of a conventional PC server, but as a specialist implementation requires less power.

Backhaul Ground Stations (BG Stations)

As discussed, this embodiment may benefit from the provision of one or more BG stations. The BG stations can provide the communication links to and from the platforms and the processing centre. Each BG station should be able to communicate independently with as many platforms in line of sight as possible, to maximize the data rate capabilities of the platforms and the BG station.

Typically there are therefore at least as many beams formed at each BG station as platforms visible from the individual BG stations. Using sparse phased arrays as the communication system at the BG stations can provide this facility. The design of these phased arrays can be similar to those on the platforms.

BG stations can provide the high-speed data links between the aircraft and the processing centre. To reduce the number of BG stations and their associated costs, it is useful for the BG stations to have multi-beaming capability so that they can each communicate with each aerial antenna independently when there is a group of multiple antennas, to provide the high data rates required for the network. By this means the data rate to or from each BG station can be increased by a factor equal to the number of aircraft being communicated with over that which would be possible with a single aircraft. A sparse phased array has a larger diameter than a dense phased array with an equivalent number of antenna elements. The sparse array has a smaller beam enabling independent communications to aircraft that have a closer angular spacing than the dense array can resolve.

Figure 7:
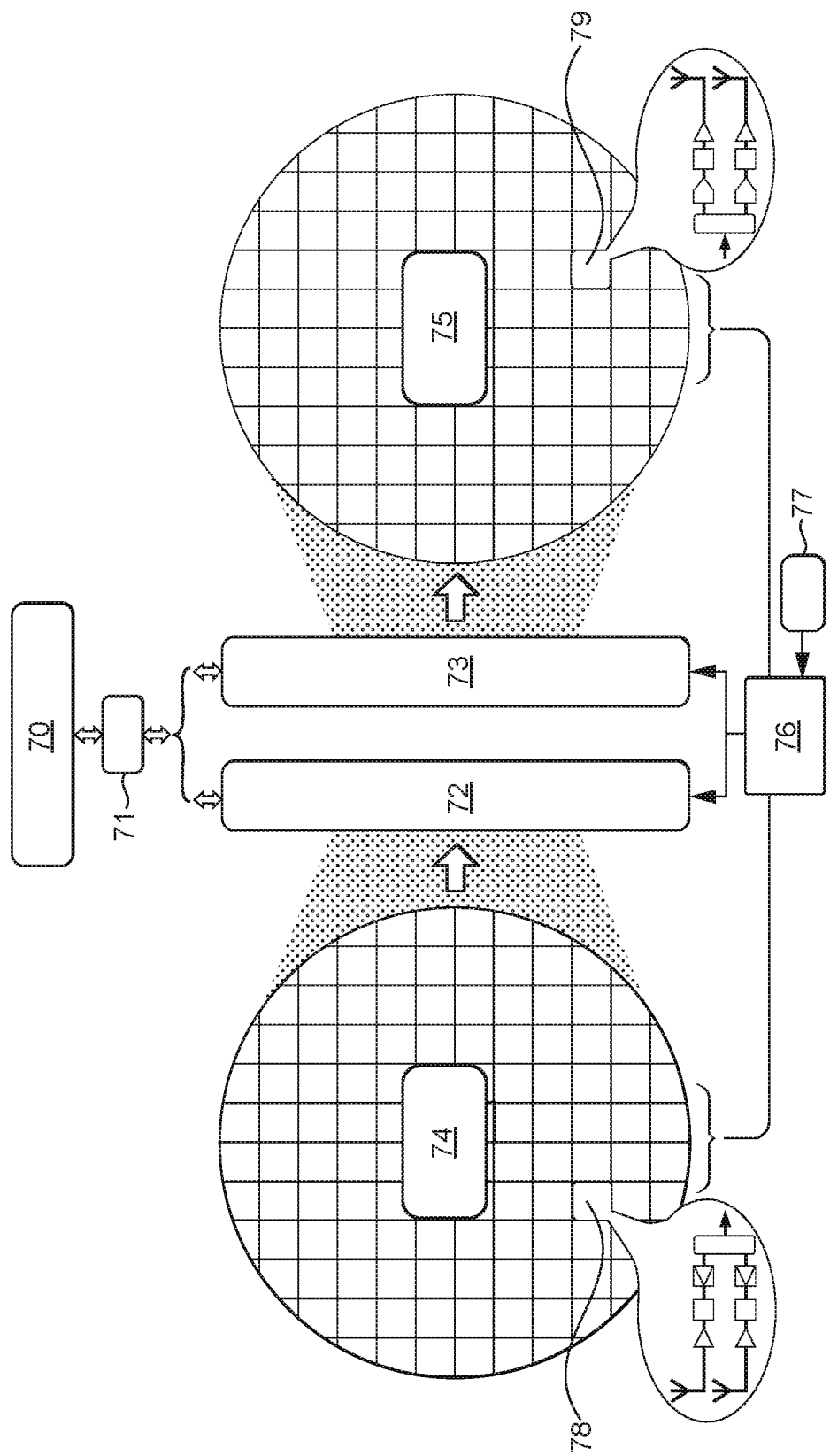
FIG. 7 is a schematic arrangement of a backhaul ground based station (BG Station) system.

An implementation using sparse phased arrays similar to the systems used on the aircraft is illustrated in FIG. 7. As with the aircraft phased arrays there are separate transmit (75) and receive (74) arrays.

The receive array (74) has a large number of elements (78) which provide signals to the receiver processing system (72). The transmit array (75) has a large number of elements (79) which receive signals from the transmitter processing system (73). Both receiver and transmitter processing systems interface (71) with the processing system (70). They also can require input from a clock system (76), which in turn receives input from a positioning system (77).

BG stations are separated far enough apart for beams from the individual aircraft arrays to resolve them independently with different array beams. This is to provide a sufficient aggregate data rate to every aircraft.

In the example shown, BG stations are under the direct control of the processing system; the processing system determines the amplitude and phase for every array element.

In certain locations where the availability of BG stations is low, it may be advantageous to link one aircraft with another more suitably located over BG stations by laser or free space optical devices. These have been developed in recent years and allow high data rate communication (greater than 1 Giga bit per second) with modest (under 100 W) power consumption and can be of modest weight of less than 25 kg but able to communicate in the stratosphere at distances of at least 60 km, and more preferably of 250 km and on occasion of 500 km or more. With such an arrangement it is possible for one or more aerial antennas to be linked to BG stations many hundreds if not thousands of kilometers distant by utilizing laser links between additional aircraft.

Data Rates

The data rate available depends upon the bandwidth available from the band that is in use. For this embodiment, it is assumed that the band is LTE Band 1 (other frequencies are also available):

| Uplink: | 1920 MHz to 1980 MHz | 60 MHz bandwidth |
|---|---|---|
| Downlink: | 2110 MHz to 2170 MHz | 60 MHz bandwidth |

In certain embodiments, the links to individual UEs will only use the bandwidth required for the function being used, hence the bandwidth can be sub-divided to service as many users as possible.

The data rates through an example HAP-CELL system are shown in Table 1. As can be seen this is using Band 1 frequencies and 50 aircraft in a fleet. The data rates per link are dependent upon the signal to noise ratio of the link; hence there is an expectation of higher data rates in the same bandwidths for the backhaul links than to the UEs. This is because the connection to the backhaul can be much better managed due to the fixed, outdoor nature of the equipment and the potential for using higher transmission power and larger antennas than for mobile UE.

As can be seen the maximum data rate to the UE is very high, assuming the use of clear, high signal to noise ratio connections. As with all cellular networks, the data rate will be adjusted for the actual link performance.

There is a very strong trade-off of the number of BG stations and the power that can be used for each link. It is worth noting that the dominant data communications will be between the network and the user, with typically a lower data rate on average on the return path. This means that a higher power can be used from the ground stations to the aircraft for a higher number of bits per Hertz for a better spectral efficiency; also, a higher power for transmission from the aircraft than is used by the user for enhanced data rate on that link.

Use of 28/31 GHz Bands

There are frequency bands at 28 GHz and 31 GHz allocated by the International Telecommunications Union to HAP downlink and uplink communications in many countries as follows:

| | | |
|---|---|---|
| Downlink: | 27.5 GHz to 28.35 GHz | 850 MHz bandwidth |
| Uplink: | 31.0 GHz to 31.3 GHz | 300 MHz bandwidth |

These provide considerably more bandwidth than the 2 GHz frequencies commonly used for—mobile networks, but are harder to implement with conventional electronics—particularly as a dense phased array.

TABLE 1

Example HAP-CELL system, 50 aircraft, 2 GHz single arrays (values used for indicative sizing of the system)

| System | Value | Comments |
|---|---|---|
| No. of Aircraft | 10 to 50 | Aircraft in a single fleet |
| No. of BG stations | 157-416 | This depends upon encoding and number of polarisations on backhaul links. |
| Bandwidth | 60 MHz | LTE Band 1: Chosen band for illustration purposes |
| Wavelength, λ | 15 cm | ~2 GHz |
| Aircraft height | 20 km | Lower stratosphere and well above commercial airspace |
| Service area diameter | 60 km | Within max. scan angle of aircraft phased arrays allowing for pitch and yaw of aircraft |
| Platform mounted phased array: | | |
| Diameter | 1.5 m-5.0 m | Selected to fit on the aircraft with good performance |
| Number of antenna elements | 315 | |
| Polarisations | 2 | Dual polarization for beamforming and high reliability for user links. |
| Max. antenna scan angle | 60° | Physical limitation, 20 tan (60°) = 34.6 km, defines Service area |
| No. of array beams formed | ~160 | 50% × number of antenna elements: The number of patches is restricted for good definition of the edges. |
| Patch size | 1.0 km × 1.0 km to 4.7 km × 4.7 km | Defined by the size of the arrays |
| Backhaul data links: | | |
| Implementation | Phased array beams | Uses additional virtual patches on the aircraft phased arrays |
| Polarisations | 2 | Dual polarization, for beamforming performance. In principle could use separate polarisations for data - but not considered here. |
| Modulation | 256-QAM | 8-bit/symbol. |
| Data rate per link (max) | 480 Mb/s | 8-bit/s/Hz * 1 polarisations |
| Data rate per link (min) | 360 Mb/s | 6-bit/s/Hz (64-QAM) * 1-pol |
| Data rate per BG station | 18 Gb/s | Direct communication with 50 aircraft (in this example) - 1 Polarisation |
| User data links: | | |
| Patches | 160 | For a 60 km dia. service area with 1.5 km patches |

TABLE 1-continued

Example HAP-CELL system, 50 aircraft, 2 GHz single arrays (values used for indicative sizing of the system)

| System | Value | Comments |
|---|---|---|
| Polarisations | Identical | Identical information to avoid phone orientation issues |
| Modulation, max | Up to 64-QAM | 6-bits/symbol. This is the fastest modulation on very good links |
| Modulation, average | 2-bit/symbol | The average data capacity per link. |
| Data rate max for 1 user | 360 Mb/s | The absolute max data rate with full BW and 64-QAM |
| Data rate per aircraft (typ.) | 19.2 Gb/s | 120 Mb/s per patch * 160 patches |
| System Data rates: | | |
| Data rate per patch, max | 6 Gb/s | 120 Mb/s per plane, 50 planes |
| Data rate over Service area, max | 960 Gb/s | Assuming 50 planes in fleet in line of sight |

Power Requirements for Aircraft Payload

The payload power usage on the aircraft considered is for the communications arrays, the digital processing systems on board and the control and positioning systems. Keeping the aircraft payload power requirements low is important for the limited power availability in aircraft operating at high altitude.

For the sparse phased array receivers and transmitters the power will scale as the number of antenna elements. Performing as much processing as is practical in the ground based processing facility minimizes the processing requirements at the aircraft. The power for the large number of digital interfaces will dominate the processing power.

Estimates for power consumption are shown in Table 2. This is an example calculated for an aircraft incorporating two 315-element sparse phased arrays for transmit and receive. Each array has 315 dual polarization antenna elements; each array therefore has 630 signal channels. The power requirements are for ~1.6 kW with these arrays.

The elements of the processing system located on the platform are implemented using standard components and as such will benefit over time from the improvements in processing available per unit of power consumed.

This would scale almost linearly with the number of elements. Hence 1500-antenna element arrays would be approximately four times this power requirement.

TABLE 2

Estimated power requirements for airplane with 2 × 315-antenna element 2 GHz arrays

| Subsystem | Power each (W) | Number | Power total (W) | Comments |
|---|---|---|---|---|
| Receive array: | | | | |
| LNA & gain chain | 0.5 | 630 | 315 | |
| Digitisation & communications | 0.2 | 630 | 130 | |
| Power losses | | | 45 | 10% power distribution losses |

TABLE 2-continued

Estimated power requirements for airplane with 2 × 315-antenna element 2 GHz arrays

| Subsystem | Power each (W) | Number | Power total (W) | Comments |
|---|---|---|---|---|
| Transmit array: | | | | |
| DAC & communication | 0.2 | 630 | 130 | |
| Power amplifier | 0.5 | 630 | 315 | Assuming 250 mW RF power per polarization Tx, 50% efficiency |
| Power losses | | | 45 | 10% power distribution |
| Signal processing: | | | | |
| Processing | | | 200 | 10 FPGA's at 20 watts (processing) each |
| Signal transport | 0.1 | 630 | 65 | Inter-FPGA links |
| Control, clocks, orientation: | | | | |
| Estimate | | | 400 | Substantial processing resources |
| Total | | | 1635 | |

Effect of Aircraft Based Communications on Mobile Users

Communication links between aerial antennas and BG stations will normally be at above 30 degrees elevation resulting in a consistent signal for a given location. For UE the signals to and from the aerial antenna will often be passing through roofs of buildings, which will result in significant losses. However, in large systems, with many aircraft over adjacent, or overlapping service areas, then there is a high likelihood of signals coming in obliquely through windows and walls, which are typically more transparent to the signals.

The aircraft are up to 35 km away and have a round trip link of more than 70 km; the processing will have some buffering delays. The delays will not add up to more than a few milliseconds which is well within current mobile network specifications of <30 ms or proposed 5 G specifications of <5 ms.

Multiple Service Areas

Figure 8:
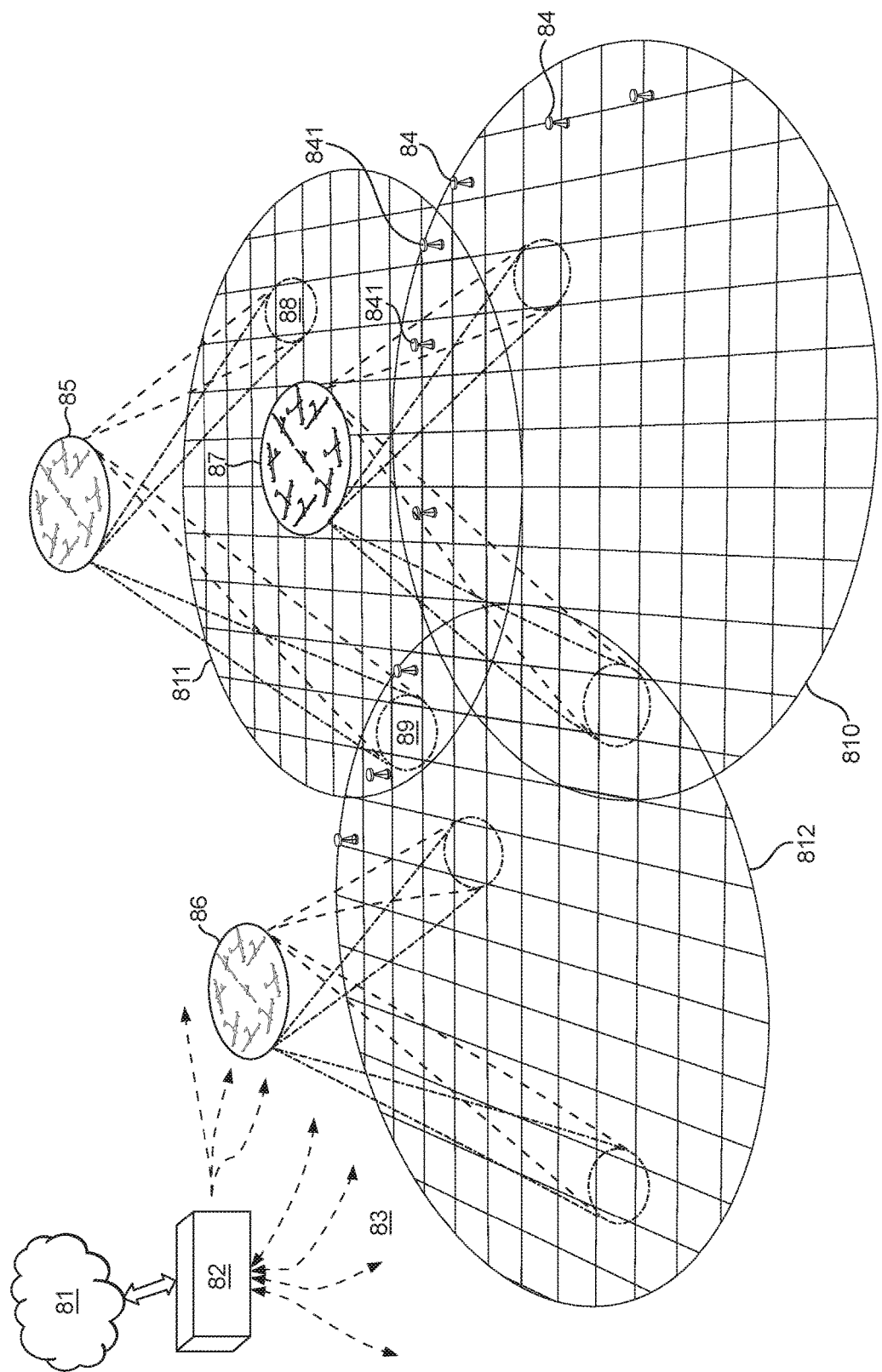
FIG. 8 illustrates multiple HAP-Cell systems.

The HAP-CELL system is intended for use over large areas. For densely populated areas e.g. major cities, there may need to be multiple fleets of aircraft serving multiple service areas. The system readily scales in this fashion and economies of infrastructure and additional communication capabilities become available. A multiple system is illustrated in FIG. 8. There are three fleets of aircraft (85,86,87) identified. The cellular network and Internet (81) interfaces with one or more processing centres (82), which are linked by fibre optic cables or by microwave (83) to BG stations (84 or 841). Each service area (810, 811,812) is approximately 60 km in diameter. As can be seen the service areas can overlap which provides higher total data rate for users. There is also the benefit of improved coverage, for example, if a user is shielded from a fleet of aircraft by being on the "other side" of a building, then there is likely to be coverage from an adjacent fleet.

Due to the user beam from a fleet of aircraft being "private" to an individual user there is no significant interference from adjacent fleets, or beams from adjacent fleets that are spatially separated.

There will be a significant saving in infrastructure. BG stations (841) can service more than one fleet of aircraft if they are suitably positioned. The BG stations form beams to each aircraft within a fleet, consequently, provided the fleets are within range then a BG station can service all the fleets within 30 km to 35 km.

The design of an area's coverage should consider how a number of aircraft, e.g. 50-100, should be deployed in fleets to have maximum benefit. There may be more, smaller fleets or fewer large ones with appropriate degrees of service area overlap. The details will depend upon the population density and other factors, but the HAP-CELL system can allow these trade-offs to be made.

Summary of Benefits of the User Antenna Phased Array Beam-Forming System with Spatial Resolution of Individual HAP Antennas or Constellations of HAPs By using phased array antennas linked to user equipment to resolve individual HAP antennas or constellations of antennas ("beams from the sky") confers the following benefits over existing mobile phone and communication systems:

High Data Rate Links:

The traditional operation of a mobile network divides the network into a set of "cells." Multiple UEs within a cell must share the available resources (signal bandwidth and communication power), which determine the maximum data rate to a user either by radio resource sharing techniques, for example, but not exclusively, sharing bandwidth or time multiplexing. A key element is that by spatial resolution "beams from the sky" allows all the resources or the multiple beams, which can be made available by the implemented protocol to be used by a single device. Resource sharing, as in standard implementations, is also supported by the invention.

Low Costs Stand-Alone "Box" Systems:

Instead of connecting buildings by high speed "Fibre to the Home" optical fibre, high speed data links (1 Gbps or above) can be provided by a stand alone phased array linked to a WiFi system and solar powered put externally to the building or in loft space or by windows. The cost of such systems is potentially far cheaper than the cost of installing fibre links to buildings particularly in rural areas.

Wide Coverage Area:

The horizon for an antenna on a platform at 20 km altitude is at approximately 500 km radius. The elevation of such an instrument from any particular location on the ground is defined as the angle the instrument is above the horizontal at that point. For the platform to be above 5 degrees elevation, any location on the ground will be within a circle of radius 200 km centred directly below the platform. For elevations greater than 30 degrees the location must be within circle of radius 35 km centred below the platform. The latter constraint is appropriate for communications between the ground and a platform carrying only phased arrays situated in a horizontal plane. The former constraint may be appropriate for more complex array geometries but signal strength will become a limiting factor at distances over 100 km which is discussed later.

Focused RF Power at the User:

If Aerial Inter-Antenna beamforming is used the power at the precise user antenna location is increased. This minimizes the power usage on the platform and improves link quality. This is described in detail in Tables 2 and 3.

Scalable Capability:

The number of users and data rate can be increased easily and quickly—without normally the need for additional ground based infrastructure—by adding more platforms in the same area. The addition of extra BG stations can normally be avoided unless very large capacity increases over the previous infrastructure are needed. This feature, in itself, provides substantial resilience in the system. For example, losing one platform out of ten similar platforms, due to an equipment fault or maintenance or temporarily being unavailable due to flight patterns, would reduce the capacity of the system by 10%, but still give complete coverage within the service area. Similarly, losing one ground station out of a hundred would also only lose 1% of the communication data rate capability. This is significantly better than the loss of a standard mobile phone cell mast where all users within the cells it controls will lose the signal.

Coverage Area can be Accurately Tailored:

Phased array and beamforming technology enables the coverage area to be more accurately controlled than with ground-based systems. This is important for operation close to country borders.

For reliable communication, the beamforming technology needs to manage the effects of reflections such as from walls; or diffraction effects such as from the edges of intervening objects, such as the roofs of buildings, if the UE is ground based. Ideally the antennas on many of the platforms are in line-of-sight or close to it from the UE.

TABLE 3

Glossary of terms used in this document

| Term | Definition |
| --- | --- |
| ADC | Analogue to digital converter. Within the SHAP-CELL systems converts the analogue RF signal to digital data stream for signal processing. |
| Algorithm | A process or code by which the power levels at a particular UE can be set. This might be to optimise the powers to antenna elements to ensure a minimum power level for all UE's or to ensure that given UE's had a higher power level. |
| Antenna | A phased array or conventional antenna. |
| Antenna element | An individual transmitting or receiving antenna within a phased array. Each has an individual electronic system for linking to a signal processing system. |
| Antenna weightings or coefficients | Typically, complex numbers that are used within the signal processing chain to adjust the amplitude and phase of the signals to and from individual antenna elements to form the desired beams from an antenna or constellation of antennas. |
| Backhaul communications | The data communication links from the aerial platforms to the ground and ultimately to the SHAP-CELL processing centre. |
| Beam | Directional signal transmission or reception from an antenna |
| Beamforming | Beamforming is a signal processing technique used for multiple antennas or in the case of phased arrays, antenna elements, to give directional signal transmission or reception. This is achieved by combining the signals transmitted or received so that at particular angles they experience constructive interference while others experience destructive interference. |
| Beamwidth | The angular beamwidth, as understood by practitioners skilled in the art, depends upon the ratio of the wavelength of the radiation used in said communications system divided by the separation between pairs of aerial antennas; for the conditions envisaged for this invention may be designed to be a wavelength of 15 centimeters and an aerial antenna separation of approximately 10 kilometers results in a beamwidth of less than 50 micro radians and beam size on the ground of less than 2 meters |
| Beamforming coefficients | Typically these are complex numbers that are used within the signal processing chain to adjust the amplitude and phase of the signals to and from individual antenna elements to form the desired beams from an array or constellation of arrays. |

TABLE 3-continued

Glossary of terms used in this document

| Term | Definition |
| --- | --- |
| BG stations | Backhaul ground stations. The ground based radio links to each of the platforms. |
| Cell | The logical functionality provided within an area on the earth's surface supplied with radio service. Each of these cells is assigned with multiple frequencies. |
| Constellation | A number of antennas supported by HAPs operating cooperatively over the same service area to provide communications to many UEs. |
| Conventional Antenna | An antenna which is not a phased array |
| Cooperative beam | A highly directional signal transmission or reception formed by coherently aligning beams from multiple antennas mounted on aerial platforms. |
| Correlating | Correlating is a mechanism to cross-multiply the signals to or from pairs of antenna elements, this is a fundamental part of interferometry to form the Fourier transform of the incoming or outgoing signals. |
| DAC | Digital to analogue converter. Within the SHAP-CELL system converts a digital data stream into an analogue RF signal for amplification and transmission via an antenna element. |
| DBF | Digital beam-forming |
| Femtocell | The area, normally on the ground, which is intersected by a beam carrying information to and from a piece of UE and at least three aerial antennas involved in inter-antenna cooperative beam forming. |
| Dynamic femtocell (DF Cell) | A femtocell that is moved by changing antenna weights. |
| Fleet | Fleet of platforms supporting a constellation of antennas. |
| HAP | High Altitude Platform. This is the vehicle that carries the communications equipment. It can e.g. be an unmanned aircraft, tethered balloon or untethered balloon. |
| HAP-CELL | High altitude platform cellular system, which refers to an example of an implementation using HAPs to provide cellular communications. |
| HAP-CELL Processing centre | A facility associated with one or more HAP-CELL systems to control the communications to and from BG Stations, HAPs, UEs and the cellular network. |
| Macrocells | A cell in a mobile phone network that provides radio coverage served by a high power cellular base station. |
| MBDR | Maximum Beam Data Rate from a single antenna in a independent beam |
| MBH | Multiple beam horn (antennas) |
| Microcell | A microcell is a cell in a mobile phone network served by a low power cellular base station, covering a limited area such as a mall, a hotel, or a transportation hub. A microcell uses power control to limit the radius of its coverage area. |
| Patch | The patch is a specific area, normally on the ground, which can be illuminated by every antenna in the constellation with an independent beam. |
| Payload | The equipment carried on a Platform. |
| Phased Array | A type of antenna consisting of many small antenna elements, which are controlled electronically to form one or more Phased Array Beams. Phased arrays can be used on the HAPs or BG stations |
| Phased Array Beam | The electromagnetic beam formed by a phased array. Phased array beams from a HAP illuminates a patch. |
| Platform | The platform that carries the payload - an aircraft, tethered aerostat or free flying aerostat. |
| Service Area | The area of ground over which communications coverage is provided by one or more SHAP-CELL aircraft. A service area is split into many patches. |
| Sparse phased array | A phased array where the antenna elements are separated by more than $1.2 \times \lambda/2$. |

TABLE 3-continued

Glossary of terms used in this document

| | |
|---|---|
| Spread Spectrum Technologies | A technique in which a telecommunication signal is transmitted on a bandwidth considerably larger than the frequency content of the original information. |
| Synthesised Beam | The beam formed by beamforming HAPs in a constellation. The beam is small and illuminates a "dynamic femtocell." |
| UE | See User Equipment. |
| User Equipment | The equipment used by an individual user, typically a mobile phone, tablet, or computer, but also more generally equipment with or connected to an antenna which may be stationary or in a moving situation such as in a vehicle, vessel or aircraft. Abbreviated to UE. |
| User Beam | A synthesised beam that tracks specific user equipment |
| Weightings | See Antenna weightings |

The invention claimed is:

1. A system for forming a plurality of simultaneous communication signals having an operating wavelength comprising (a) a plurality of phased array antennas each mounted on a respective high altitude platform (HAP) and (b) a phased array antenna mounted on user equipment at a lower altitude than that of the HAPs wherein the phased array mounted on the user equipment has operating antenna elements, the centres of which are spaced from their nearest operating antenna element centres by more than 1.2 times the operating wavelength and the phased arrays mounted on the HAPs have operating antenna elements, the centres of which are spaced from their nearest operating antenna element centres by more than 1.2 times the operating wavelength.

2. The system according to claim 1, wherein the user equipment and its associated phased arrays are solar powered.

3. The system according to claim 1, wherein the user equipment includes a WiFi transceiver.

4. The system according to claim 1, wherein the plurality of simultaneous communication signals have an operating frequency that is greater than 0.6 GHz.

5. The system according to claim 1, wherein each HAP provides a respective simultaneous communication signal with a phased array mounted on the user equipment.

6. The system according to claim 5 wherein the user equipment is a BG station.

7. The system according to claim 1, wherein a cluster of HAPs together form a cooperative inter-antenna beam, by beamforming between the signals from the HAPs, the cooperative beam thus formed providing one communication signal with the phased array on the user equipment.

8. The system according to claim 1, wherein there are at least five HAPs.

9. The system according to claim 1, wherein the HAPs are at an elevated location of at least 10,000 m.

10. The system according to claim 1, wherein the HAPs comprise unmanned solar powered aircraft, airships, or hybrid air vehicles.

11. The system according to claim 1, wherein the HAPs comprise unmanned hydrogen powered aircraft.

12. The system according to claim 1, wherein the HAPs comprise tethered aerostats.

13. The system according to claim 1, wherein the HAPs comprise free-flying aerostats.

14. The system according to claim 1, wherein the HAPs comprise hydrocarbon-fuelled aircraft.

15. The system according to claim 1, wherein the HAPs comprise satellites.

16. The system according to claim 1, wherein at least some of the HAPs use different phased array antennas for transmission or reception.

17. The system according to claim 1, wherein data rates to and/or from the antenna elements exceed 100 Mbps.

18. The system according to claim 1, wherein the beamforming within the phased array antenna mounted on the user equipment is adapted dynamically by modifying aerial antenna weights to provide optimal service conditions.

19. The system according to claim 1, in which the user equipment is mobile.

20. The system according to claim 1, where at least some of the user equipment is ground based.

21. The system according to claim 1, where at least some of the user equipment is on unmanned aerial vehicles.

22. The system according to claim 1, where at least some of the user equipment is on manned aircraft.

23. The system according to claim 1, where at least some of the user equipment is on some form of transportation technology.

24. The system according to claim 1, wherein the HAPs comprise multiple fleets of aerial platforms.

* * * * *